US006983364B2

(12) United States Patent
Gougeon

(10) Patent No.: US 6,983,364 B2
(45) Date of Patent: Jan. 3, 2006

(54) SYSTEM AND METHOD FOR RESTORING A SECURED TERMINAL TO DEFAULT STATUS

(75) Inventor: Dominique Gougeon, Rocklin, CA (US)

(73) Assignee: Hewlett-Packard Development Company, LP., Houston, TX (US)

( * ) Notice: Subject to any disclaimer, the term of this patent is extended or adjusted under 35 U.S.C. 154(b) by 880 days.

(21) Appl. No.: 09/893,479

(22) Filed: Jun. 29, 2001

(65) Prior Publication Data

US 2003/0005294 A1 Jan. 2, 2003

(51) Int. Cl.
*G06F 9/00* (2006.01)

(52) U.S. Cl. .......................... 713/2; 713/165; 713/185

(58) Field of Classification Search .................... 713/1, 713/2, 100, 185, 165
See application file for complete search history.

(56) References Cited

U.S. PATENT DOCUMENTS 5,406,619 A * 4/1995 Akhteruzzaman et al. ...................... 379/93.02
5,956,408 A * 9/1999 Arnold ...................... 713/189
6,308,268 B1 * 10/2001 Audebert .................... 713/182
6,404,862 B1 * 6/2002 Holt ........................ 379/93.02
6,711,263 B1 * 3/2004 Nordenstam et al. ....... 380/282

FOREIGN PATENT DOCUMENTS

EP 940675 A1 * 9/1999

* cited by examiner

*Primary Examiner*—Gregory Morse
*Assistant Examiner*—Jacob Lipman

(57) ABSTRACT

Upon receiving a request to clear or reset a terminal, the terminal displays a random number, the random number is placed in a regular file and signed by a private key to created a signed clear file, the clear file is authenticated, and the original random number is replaced by a new random number, thereby ensuring the authenticity of the clear or reset request while protecting the terminal from replay attacks.

16 Claims, 3 Drawing Sheets

SYSTEM AND METHOD FOR RESTORING A SECURED TERMINAL TO DEFAULT STATUS

BACKGROUND OF THE INVENTION

1. Field of the Invention

The invention relates to a system and method for resetting or clearing a secured terminal in preparation for the loading of new application programs, certificates, or other files into the terminal, and in particular to a system and method which, upon receiving a request to clear or reset the terminal, creates a single-use "clear" file that can be digitally signed in order to authenticate the source of the clear or reset request.

According to the invention, the procedure for clearing or resetting the terminal begins with generation by the terminal of a random number. A dynamic clear file including the random number is then created, digitally signed, and authenticated upon loading the signed clear file into the terminal.

In an especially preferred embodiment of the invention, authentication is accomplished by signing the clear file using the private key of a public key-private key cryptosystem, authenticating the digital signature using a signer public key certificate downloaded into the terminal with the signed clear file, authenticating the signer certificate using a "clear" certificate stored in a root directory or within factory-installed firmware within the terminal, and initiating the reset operation in response to reading of a clear string stored in the file type field of the signer certificate.

Optionally, the private key used to sign the clear file may be embedded in a smart card and protected by one or more PINs, thereby permitting authentication to be carried out without compromising the private key. In that case, the signer certificate may also be stored on the smartcard and downloaded to the terminal with the signed clear file.

By providing an authenticatable clear file, the invention allows a terminal to be restored to default status by a technician in the field without having to rely on static password protection of the reset operation. In addition, since the random number included in the clear file changes with every reset operation, thereby ensuring that the clear file can only be used once, the invention prevents a replay attack resulting from copying of the signed clear file.

2. Description of Related Art

Clearing of files or certificates from a terminal and restoration of the terminal to a default status is typically required when a terminal changes ownership, in preparation for the loading of new application programs, certificates, or other files into the terminal. While a number of systems and methods have been proposed to ensure the authenticity of files loaded into the terminal, the clearing operation has conventionally relied on relatively weak static password protection methods.

The problem with use of stronger file authentication techniques to protect clearing of application programs or certificates from an existing terminal is that (i) in the conventional clearing operation, reset is carried out by invoking a "clear" command in the terminal's operating program, and therefore there are no files to be signed, and (ii) even if the clear command were required to be provided in an authenticatable file, the "clear file" would be vulnerable to copying and replay.

As a result, even where the terminal is part of a system that provides for strong authentication of any files loaded into the terminal, the process of clearing applications and/or certificates from the terminal and restoration of the terminal to a default setting, is currently carried out by either requiring return of the terminal to a secure facility, or by providing a static password and permitting the clearing operation to proceed only upon entry of the static password. Requiring the terminal to be uninstalled and returned to the secure facility for clearing is obviously inconvenient, while permitting the terminal to be cleared based on a static password carries all of the risks normally associated with static passwords, including password theft, leaving the terminal vulnerable to mischief.

SUMMARY OF THE INVENTION

It is accordingly a first objective of the invention to provide a system and method for restoring a terminal to a default status that does not require return of the terminal to a secure facility.

It is a second objective of the invention to provide a system and method for restoring a terminal to the default status in which authorization to perform the clearing operation can be verified without relying solely on passwords.

It is a third objective of the invention to provide a system and method for returning a terminal to the default status which provides an authenticatable clear file, and yet that is invulnerable to replay attacks.

These objectives are achieved in accordance with the principles of a preferred embodiment of the invention, by providing a method and system for returning or resetting a terminal to default status that uses a dynamic password method based on a random value to create an authenticatable clear file, the reset procedure being executed only upon authentication of the clear file.

More particularly, according to the method of the invention, the following steps are carried out:

- a menu in the system mode of the terminal displays an eight-digit random value;
- the random value is put is a regular file and the file is signed by a "clear" signer smartcard using a file signature tool;
- a signer's public key certificate corresponding to the private key is retrieved from the smartcard, the signer's public key certificate including, in its fileTYPE field, a clear string used to initiate the clear procedure following authentication;
- the signature file along with the clear signer certificate is downloaded to the terminal;
- the terminal retrieves the random number and compares it with the stored random number using the signer public key certificate, and/or compares values derived from the signed clear file and the stored random number, in order to authenticate the clear file;
- the terminal authenticates the signer certificate by referring to a sponsor's clear certificate stored in the terminal;
- upon successful authentication of the signed clear file and signer certificate, the existing certificate tree is deleted form the terminal and a manufacturing certificate tree is saved in the flash/rom is restored, after which the terminal is ready to be downloaded with any other certificated configurations;
- a new random number is generated to prevent a replay attack.

While the method of the invention may be used with any terminal system capable of file authentication and generation of a random number, and is not to be limited to any particular authentication method, in an especially preferred embodiment of the invention, the clear file containing the random number is signed by a system that includes a private key contained on a smart card protected by multiple PINs, and a corresponding public key certificate modified to include a clear string in, for example, the FileType field, and in particular that includes the following elements:

- a certification authority/smartcard management system that issues smartcards containing a signer certificate, a private key for generating digital signatures, one or more PINs for accessing each of the smartcards, and an embedded secured processor capable of performing all digital signing operations that require access to the private key;
- a customer file signing tool including a smartcard reader arranged to digital sign a file upon input by the user of one or more PINs corresponding to the PIN or PINs on the smart card, the smartcard performing all operations that require access to the private key before supplying the results of the operations to the customer file signing tool for further processing as necessary to generating a digital signature that can be appended to the file together with the signer certificate and downloaded to the terminal;
- a terminal to which the signed file is to be downloaded, the terminal including a means for verifying the digital signature according to the signer certificate, and a higher level "sponsor certificate" or "owner certificate" for authenticating the signer certificate. It is noted that the term "sponsor certificate" is generally equivalent to the term "owner certificate," and that these terms are used interchangeably herein.

DETAILED DESCRIPTION OF THE PREFERRED EMBODIMENTS

Figure 1:
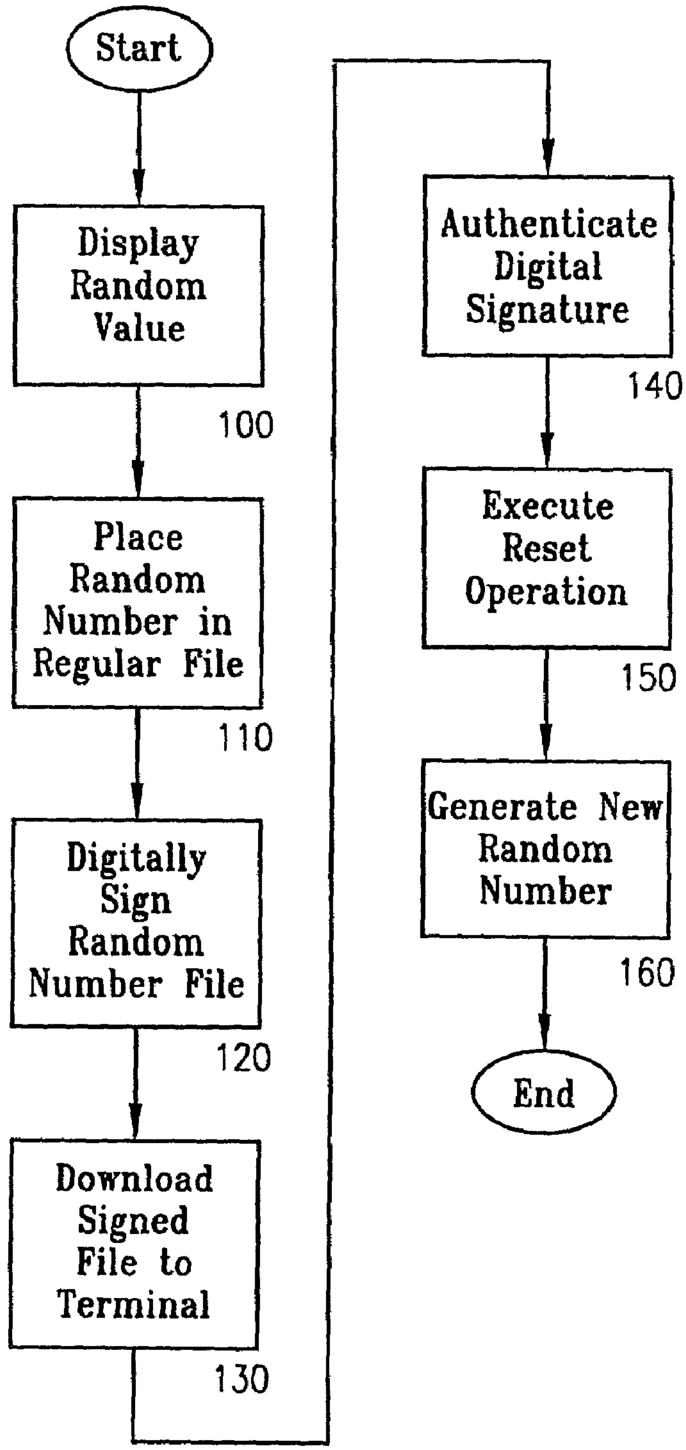
FIG. 1 is a flow chart illustrating a method of clearing or restoring a terminal to its default state in accordance with the principles of a preferred embodiment of the invention.

As illustrated in FIG. 1, the preferred method of clearing or restoring a terminal to default status involves the following steps:

- a menu in the system mode of the terminal displays an eight-digit random value stored in the terminal (step 100);
- the random value is put in a regular file (step 110);
- the clear file thus created is digitally signed (step 120);
- the signature file is downloaded to the terminal (step 130);
- the terminal authenticates the signer certificate using a sponsor certificate stored in the terminal and checks a value derived from the signature using the signer certificate against a value based on the random number stored in the terminal in order to authenticate the signed clear file (step 140);
- upon successful authentication, the terminal is reset or cleared (step 150), for example by deleting an existing certificate tree and installing a manufacturing certificate tree previously saved in the flash/rom of the terminal; and
- a new random number is generated to prevent the replay attack (step 160).

Figure 2:
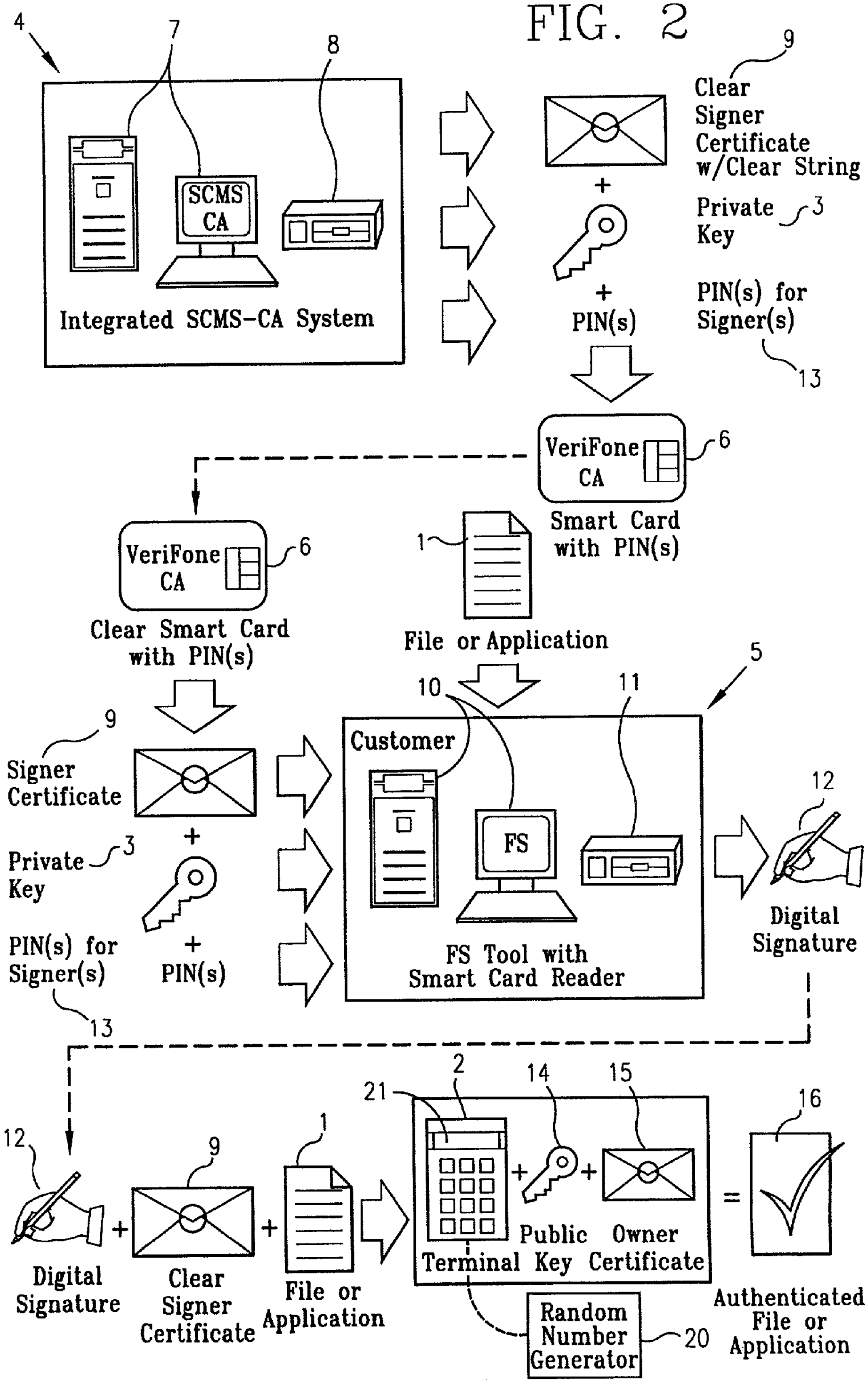
FIG. 2 is a schematic diagram of a key management and file authentication system in which the method and system of the preferred embodiment may be utilized.
Figure 3:
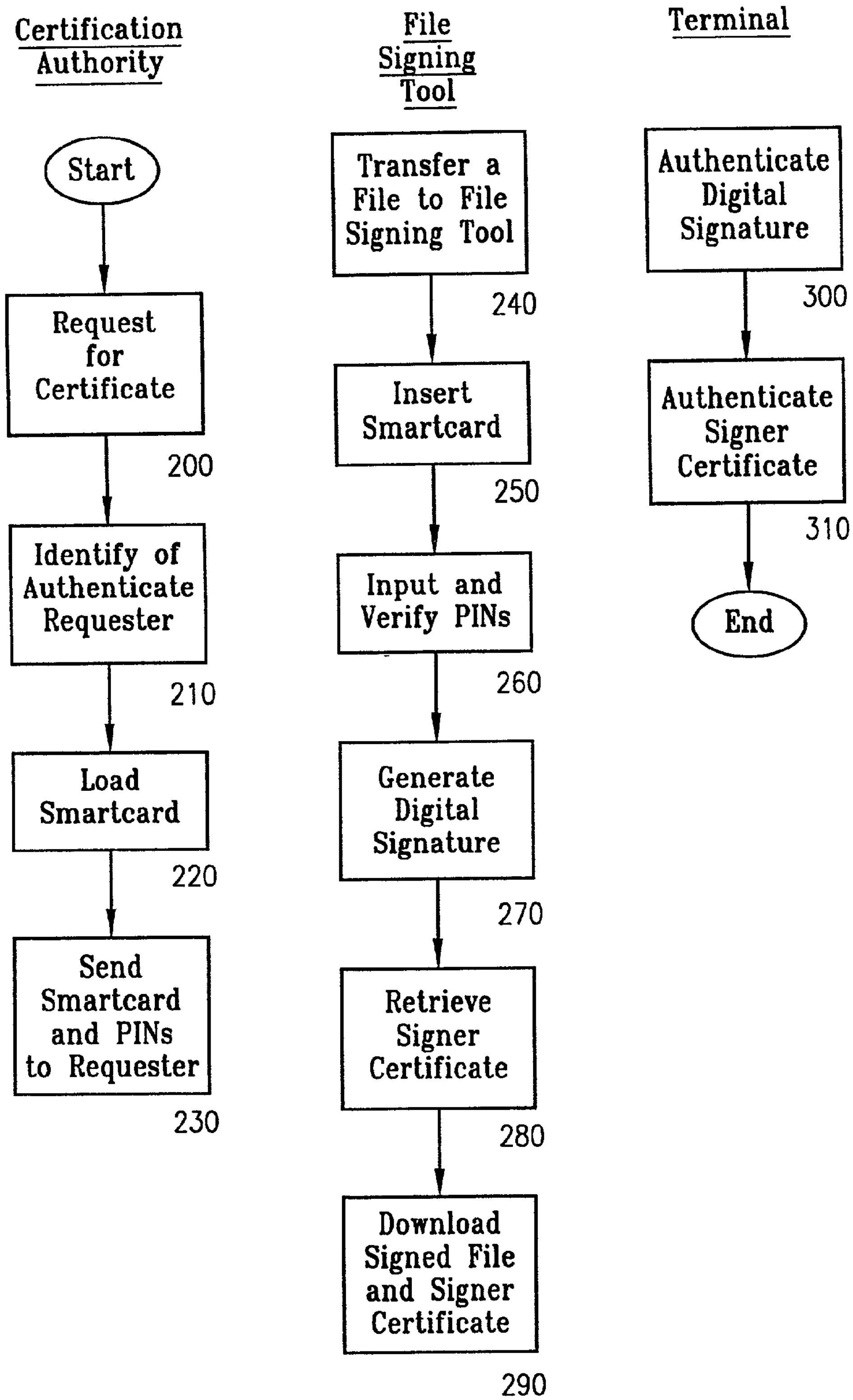
FIG. 3 is a flowchart of a key management and file authentication method corresponding to the system illustrated in FIG. 2.

Turning to FIG. 2, the preferred system includes a terminal 2 having a random number generator 20, a display 21, and storage for the random number. Also included in the preferred system is a file authentication arrangement, one example of which is discussed in detail below, although it will be appreciated by those skilled in the art that, for purposes of the present invention, any file authentication system capable of authenticating a signed clear file including the random number may be used, and that the specific file authentication system illustrated in FIG. 2, and the method illustrated in FIG. 3, are included herein solely for purpose of illustration and not by way of limitation.

As illustrated in FIG. 2, the system of the preferred embodiment of the invention includes, in addition to terminal 2 and random number generator 20, a certification authority/smart card management system 4 that issues smart cards 6 containing one or more signer certificates 9, one or more private keys 3 corresponding to the signer certificates for generating digital signatures, and PINs 13 for enabling controlled access to the digital signing process carried out by the file signing tool 5, to which the random number generated by the terminal is input during the clearing authentication process.

Smartcards 6 are arranged to store the private key 3 in such a manner that the private key can only be accessed by a secure processor embedded in the smartcard, and programming of the secure processor so that it performs all digital signing operations that require access to the stored private key. As indicated above, PIN protection may, in some circumstances, be omitted, for example where the smartcard is to be used by the terminal manufacturer to load files during software development. In addition, it is possible within the scope of the invention to convey the clear signer certificate to the terminal by a channel separate from the illustrated channel, which involves storage of the signer certificate on the smartcard and retrieval of the signer certificate by the file signing tool, described in more detail below.

Smartcards that include a secure processor and the capability of storing information in a manner that ensures that the stored information can only be accessed by the secure processor are commercially available from a number of sources, and the present invention can use any such smartcards. In addition, the present invention could utilize other types of portable storage/processing devices, including optical cards having internal secure processors. The exact structure of the smartcard is not critical, so long as the smartcard is capable of performing all necessary file signing operations that require access to the stored private key. It is possible, for example, to perform all digital signing operations on the smartcard, or to assign operations that do not require key access to the file signing tool 5. of course, it is essential that the private key stored on the card cannot be accessed by physically tampering with the card, but tamper protection features are readily available in conventional smartcards.

In the preferred embodiment of the invention, the entity that prepares the smartcard 6 is certification authority/smartcard management system 4. While the certification authority/smartcard management system of the preferred embodiment of the invention is not to be limited to a particular hardware configuration, one possible configuration is a regular PC 7 running Windows NT, a smartcard DataCard reader/printer 5 that prints information on the cards and that loads the private keys and certificates into the smartcard, and a GCR410 smartcard reader used to validate the generated smartcard before sending it out. The private key may be generated by any private-public key generating algorithm, of which a number are well-known.

Also in the preferred embodiment, the clear signer certificate 9 associated with the private key 3 stored on the card may, by way of example and not limitation, comply with the IUT X509-V3 generic certificate standard, and in particular the PKIX-X509 profile. Since this is a publicly available standard well-known to those skilled in the art, further certificate definitions are not included herein, except to note that the signer certificate definition includes a fileTYPE field into which a clear string may be placed, and several private field extensions to the predefined version, serial number, algorithm identifier, issuer, validity period, key owner name, public key, and signature fields of the certificate may be added to define specific key properties. Especially advantageous are extensions that limit file types attached to the certificate, key width (which permits multiple keys to be loaded in the same field is the key is "narrow," for example in the case of sponsor certificates), and an identifier for a replacement certificate.

The customer file signing tool 5 may also include a regular PC 10 running Windows NT, and a GCR410 smartcard reader 11 that receives the smartcard and uses it to process files for downloading to the terminal 1. In particular, the file signing tool must at least be capable of receiving the random number generated by the terminal, or a regular file that includes the random number, of supplying data necessary to the digital signing process to the smartcard reader for transfer to the smartcard, of receiving the digital signature 12 from the smartcard, and of supplying the digitally signed file to the terminal 1, preferably together with the signer certificate retrieved from the smartcard.

If the smartcard is to be protected by a PIN 13, then the file signing tool 5 must be capable of relaying an input PIN to the smartcard for comparison with a PIN stored on the card by the certification authority 4. In order to enable multiple PINs to be established, it is simply necessary to include a field in the memory area of the card designating the number of PINs, and to store the multiple PINs on the card. Corresponding PINs must be sent separately from the certification authority to the file signing entity, for distribution to the person or persons that carry out the file signing. These PINs may be distributed to multiple individuals and correct entry of all PINs required to enable signing of a file, thus ensuring that a single individual cannot access the card without cooperation from all PIN holders, or the multiple PINs may be associated with multiple access levels. In the latter case, one PIN might be used to permit signing of certain non-critical types of files, while multiple PINs might be required to permit signing of critical file types.

In addition to generating and storing the random number, terminal 2 must be capable of authenticating the downloaded clear file by decrypting the digital signature 12 with a corresponding public key 14 derived from the signer's public key certificate 9, and of authenticating the public key certificate 9 by means of an owner's or sponsor's certificate 15 that has previously been installed in the terminal, for example by the certification authority, and preferably by using appropriate authentication procedures.

As indicated above, the invention is not to be limited to a particular type of terminal 2. However, by way of example and not limitation, the terminal 2 may be a PINpad terminal of the type commonly used in retail establishments to read credit or debit cards, and to permit the customer to enter an associated PIN. One example of such a transaction terminal is manufactured by VeriFone, Inc., a division of Hewlett Packard. Such PINpads are connected to a central computer that receives customer data from the PINpad, processes the data, and sends the results of the processing back to the PINpad to indicate whether the transaction is approved.

The VeriFone terminal core, for example, utilizes a single chip microcontroller with GPV3 functionality implemented as an on-chip hard-coded ROM and fixed-use RAM with sufficient input/output capabilities to drive a display, scan a keypad, support a magnetic card reader and primary interface, and a communications port for communicating with a main processor internal or external to the host platform. Additional support for authentication may be provided by an optional transaction speed coprocessor arranged to provide RSA cryptography functions, and to communicate with the core processor by means of triple DES encoding or a similar data protection algorithm. The input/output features of the terminal may be omitted when the core is used as a security module in a PINpad.

Since the signer certificate used to authenticate the file is downloaded to the terminal 2 together with the digitally signed file, it is necessary for the terminal to authenticate the signer certificate. In the embodiment illustrated in FIG. 1, the signer certificate is signed by the certification authority 4 and authenticated by an owner or sponsor certificate previously installed in the terminal.

Although not shown, the terminal may also include further certificates used to authenticate the one or more owner or sponsor certificates during installation. The terminal 2 may include a single partition or multiple partitions which can be assigned to different sponsors, such as different banks and/or credit card companies, for storing application programs that control data communications, customer prompts, and so forth. Each of these partitions has a different owner's or sponsor's certificate for authenticating signer's certificates.

The partitions may, preferably, be arranged in a hierarchy that permits different levels of authentication within a partition. Initially, the terminal is provided with a root platform certificate in a secure root directory. The root certificate is used to authenticate an operating system partition certificate and an application partition certificate that permit operating software loaded by the manufacturer or that authenticates the operating system owner certificate of another party such as the key management authority to be authenticated so that the other party can load operating system software, and that permits the key management authority to authenticate owner or sponsor certificates for the application areas of the terminal.

Although not required by the present invention, the partitions may advantageously be arranged in a hierarchy that permits different levels of authentication within a partition. Initially, the terminal is provided with a root platform certificate in a secure root directory. The root certificate is used to authenticate an operating system partition certificate and an application partition certificate that permit operating software loaded by the manufacturer or that authenticates the operating system owner certificate of another party such as the key management authority to be authenticated so that the other party can load operating system software, and that permits the key management authority to authenticate owner or sponsor certificates for the application areas of the terminal.

In addition to securing the terminal against unauthorized access through file transfers, the terminal should of course be physically secured, for example by arranging the terminal to erase information if an attempt is made to pry open the case without proper authentication, or by rendering the terminal inoperative upon repeated such attempts. Similar protection against physical tampering may also be provided for the smartcard or secure processing unit. Such tamper prevention arrangements are well-known and are not part of the present invention.

Turning to FIG. 3, the preferred method of authenticating the clear file involves three principal subroutines or sub-methods carried out, respectively, by certification authority 4, file signing tool 5, and terminal 2. The three sub-methods are certification, signing, and authentication.

The certification subroutine or method begins when a request for a clear certificate is received by the certification authority (step 200). The certification authority then collects data concerning the identity of the requester for the purpose of creating the certificate or, if the requester is an existing customer, authenticates the requester (step 210) by asking the requester to the use the file signing tool and an existing signer certificate to sign a file supplied by the certification authority, thus enabling the certification authority to verify that the requester is entitled to new signer or clear certificates for a particular sponsor certificate. The order is then confirmed by the requester, signer certificates for the previously generated sponsor certificate are generated, and the signer certificates, private key(s), and PIN(s) are loaded onto a smartcard (step 220). Finally, the smartcard is sent to the requester (step 230), as is a separate communication containing the PIN(s) necessary to use the smartcard.

When the sponsor wishes to load the clear file into a terminal, the file is transferred to the file signing tool, (step 240), the smartcard is inserted into the card reader of the file signing tool (step 250), and all necessary PINs are input (step 260). If the set of entered PINs is complete and correct, the file signing tool generates a digital signature (step 270), retrieves the signer certificate (step 280), and then downloads the digitally signed file together with the signer certificate to the terminal (step 290).

Upon receipt of the digitally signed file, the terminal authenticates the file by decrypting the digital signature and verifying that the resulting plaintext information or values correspond to values computed or derived from the stored random number (step 300). The terminal then authenticates the signer certificate by referring to a sponsor certificate previously stored or loaded into the terminal (step 310), completing the authentication process.

Having thus described a preferred embodiment of the invention in sufficient detail to enable those skilled in the art to make and use the invention, it will nevertheless be appreciated that numerous variations and modifications of the illustrated embodiment may be made without departing from the spirit of the invention, and it is intended that the invention not be limited by the above description or accompanying drawings, but that it be defined solely in accordance with the appended claims.

I claim:

1. A system for restoring a terminal having a display to a default condition when a clear file is downloaded to the terminal, comprising:

a random number generator included in the terminal; and a file authentication arrangement for authenticating a clear file that is downloaded to the terminal from outside the terminal.

wherein said terminal is arranged to execute a clear instruction in said clear file upon authentication of said clear file.

wherein said clear file includes a random number generated by said random number generator and displayed on said display so that the random number can be placed into the clear file before being downloaded to the terminal, and wherein said random number is changed each time said terminal is restored to a default condition so as to prevent replay attacks resulting from copying of the clear file.

2. A system as claimed in claim 1, wherein said file authentication arrangement includes a private key for digitally signing said clear file, and a corresponding public key clear certificate containing information necessary to authenticate the digitally signed clear file.

3. A system as claimed in claim 2, wherein said clear certificate is a sponsor public key certificate stored in the terminal and corresponding to a signer certificate downloaded with the digitally signed clear file, said signer certificate corresponding to said private key used to digitally sign said clear file.

4. A system as claimed in claim 2, wherein said private key is stored on a smartcard and is only accessible by a secure processor embedded in the smartcard.

5. A system as claimed in claim 4, wherein said sponsor public key certificate is stored in a read only memory in said terminal.

6. A system as claimed in claim 2, further comprising a file signing tool for digitally signing said clear file, said file signing tool including a smartcard reader, and wherein all digital signing operations requiring access to said private key are carried out by a secure processor embedded in a smartcard inserted into said smartcard reader.

7. A system as claimed in claim 6, wherein said smartcard further has stored thereon a signer certificate for authenticating said digitally signed clear file, and wherein said clear certificate authenticates said signer certificate.

8. A system as claimed in claim 7, wherein said signer certificate includes a file type field containing a clear string that controls clearing of the terminal in order to restore the terminal to its default status.

9. A method of restoring a terminal to a default condition, comprising the steps of:

generating a random number and storing the random number in a terminal;

displaying the random number on a display of the terminal;

placing the random number in a regular file following display of the random number;

digitally signing the regular file after placement of the random number to create a digitally signed clear file;

downloading the digitally signed clear file to the terminal;

authenticating the digitally signed clear file by comparing the digital signature with a corresponding value based on the stored random number;

restoring the terminal to a default condition;

generating a new random number and replacing the stored random number with the new random number after restoring the terminal to a default condition so as to prevent replay attacks resulting from copying of the digitally signed clear file.

10. A method as claimed in claim 9, wherein said step of placing the random number in a regular file comprises the steps of displaying the random number and inputting the random number to a filing signing tool.

11. A method as claimed in claim 9, wherein said step of restoring said terminal to a default condition comprises the step of deleting a certificate tree from said terminal.

12. A method as claimed in claim 9, wherein the step of digitally signing the regular file comprises the steps of inserting a smartcard having an embedded secure processor in a smartcard reader connected to the file signing tool, causing the secure processor to access the private key in order to generate the digital signature.

13. A method as claimed in claim 12, wherein the step of authenticating the digital signature comprises the step of authenticating the digital signature based on a signer public key certificate downloaded into the terminal together with the signed clear file.

14. A method as claimed in claim 13, wherein the step of authenticating the digital signature further comprises the step of retrieving a sponsor public key certificate from a read only memory in said terminal and authenticating the signer certificate using the sponsor public key certificate.

15. A method as claimed in claim 13, wherein the step of authenticating the digital signature based on the signer public key certificate comprises the steps of comparing a value derived from the digital signature using the signer public key certificate with a value derived from the stored random number to authenticate said clear file.

16. A method as claimed in claim 13, wherein the step of restoring said terminal to a default condition comprises the step of reading a clear string in a file type field of said signer public key certificate.

* * * * *